United States Patent [19]

Stellwagen et al.

[11] Patent Number: 5,341,299

[45] Date of Patent: Aug. 23, 1994

[54] GAS MOTOR CONTROL

[75] Inventors: Karl Stellwagen, Mannheim; Hans Gerstner, Heddesheim; Hasso Buchheister, Mannheim, all of Fed. Rep. of Germany

[73] Assignee: Kloeckner-Humboldt-Deutz AG, Cologne, Fed. Rep. of Germany

[21] Appl. No.: 128,316

[22] Filed: Sep. 28, 1993

Related U.S. Application Data

[63] Continuation of Ser. No. 959,178, Oct. 9, 1992, abandoned, which is a continuation of Ser. No. 490,967, Mar. 9, 1990, abandoned.

[30] Foreign Application Priority Data

Mar. 10, 1989 [DE] Fed. Rep. of Germany ....... 3907802
Jun. 8, 1989 [DE] Fed. Rep. of Germany ....... 3918683

[51] Int. Cl.$^5$ .............................................. F01N 3/20
[52] U.S. Cl. .................. 364/431.05; 60/276; 60/285; 123/527; 123/478
[58] Field of Search .................. 364/431.05, 431.06; 60/276, 278, 285; 123/527, 478, 480, 488, 490

[56] References Cited

U.S. PATENT DOCUMENTS

| | | | |
|---|---|---|---|
| 4,276,600 | 6/1981 | Hartford et al. | 364/431.06 |
| 4,466,410 | 8/1984 | Sakakibara et al. | 123/489 |
| 4,478,191 | 10/1984 | Kinoshita et al. | 123/489 |
| 4,805,578 | 2/1989 | Kikuchi et al. | 123/489 |
| 4,870,938 | 10/1989 | Nakaniwa | 123/489 |

*Primary Examiner*—Vincent N. Trans
*Attorney, Agent, or Firm*—Hardaway Law Firm

[57] ABSTRACT

A method and a device for the optimization of the efficiency and/or exhaust-gas quality of lean burning Otto-cycle gas motors or gas motors with pilot-injection ignition. The fuel-gas quality is measured by a measuring device and the measured value is fed to an electronic controller which in turn controls the oxygen concentration in the exhaust gas and/or the timing of ignition or pilot injection.

7 Claims, 1 Drawing Sheet

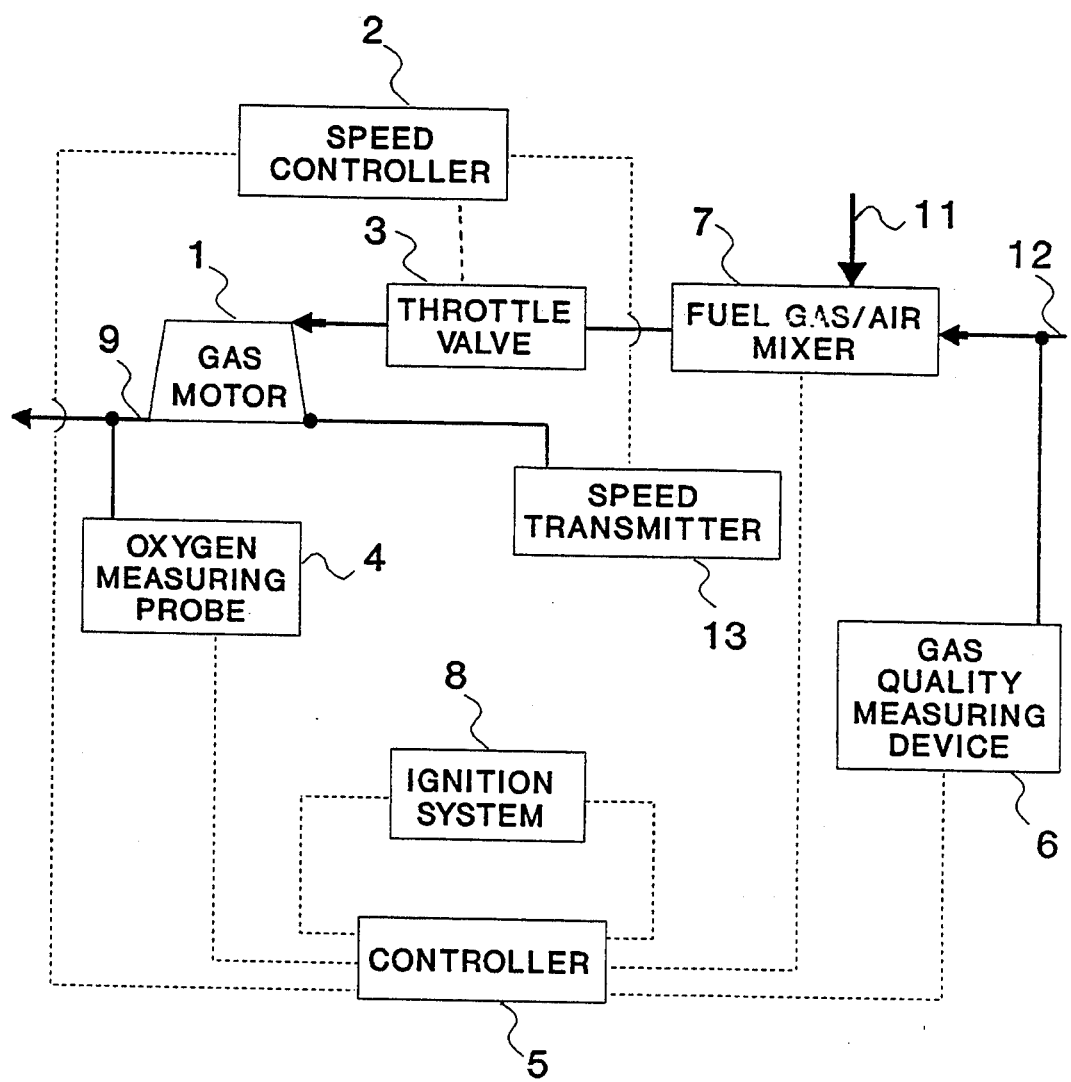

GAS MOTOR CONTROL

This application is a continuation of application Ser. No. 959,178, filed Oct. 9, 1992, now abandoned, which is a continuation of application Ser. No. 07/490,967, filed Mar. 9, 1990, now abandoned.

TECHNICAL FIELD

This invention relates to a method and a device for the operation of gas motors or engines with spark ignition or pilot-injection ignition.

PRIOR ART STATEMENT

For the purpose of attaining the prescribed exhaust-gas quality, commercial gas motors (see Dietrich, Grundmann and Langeloth, "Abatement of Pollutants from Stationary Otto-Cycle Gas Motors of Motoren-Werke Mannheim AG under the Lean-Burn Concept," Motortechnische Zeitung 47 (1988)/3, and Dietrich and Langeloth, "Abatement of Pollutants from Stationary MWMOtto-Cycle Gas Motors with the Three-Way-Catalyst Concept," Motortechnische Zeitung 45 (1984)/12) operate either with a stoichiometric fuel-gas/air mixture and downstream three-way catalyst, or with a lean fuel-gas/air mixture and no downstream catalytic treatment however, with an oxidation catalyst if appropriate.

Because of the lack of catalyst, the lean-burn concept is advantageous especially when landfill gas is employed, since the pollutants that may be present in this gas can render an exhaust-gas catalyst ineffective. A difficulty with the lean-burn concept lies in the fact that, upon fluctuations in gas quality in the direction toward lean or toward rich, such as are usual especially in landfill gases, the air requirement of the gas varies and therefore the pollutant emission limits or the miss or knock limit are exceeded.

OBJECTS AND SUMMARY OF THE INVENTION

It is the object of the invention to provide a solution for the need for a more efficient control of gas motors with spark ignition or pilot-injection ignition, which solution insures operation with low pollutant emissions and simultaneously favorable fuel consumption.

In accordance with the invention, this object is achieved by providing an additional control for determining the composition of the fuel-gas/air mixture, which control responds to changes in a measured value of the fuel-gas quality.

In this fashion, it is possible in a preferred manner to avoid the negative effects of gas-quality fluctuations, to maintain the fuel-gas/air ratio or the oxygen content in the exhaust gas necessary for the prescribed exhaust-gas quality, and to maintain the ignition point necessary for low pollutant emission and simultaneously low fuel-gas consumption.

In a preferred embodiment of the invention, the various possibilities for identification of fuel-gas quality, relating in part to the miss limit and in part to the knock limit, are described. Usually it is sufficient to analyze one characteristic of the gas. It may, however, also be advantageous to take into account two or more properties of the fuel-gas.

A preferred embodiment of the invention offers the possibility of quickly and accurately processing the many measured data of the various measuring devices and thus holding the fuel-gas/air ratio and the ignition point in the optimal range. Thus, on the one hand, compliance with the exhaust-gas regulations is insured and, on the other hand, damage to the motor or engine by means of knocking combustion is avoided-a danger that is present especially in natural-gas operation from public gas lines if propane air or butane air is added to take care of peak loads.

By means of an embodiment of the controller in accordance with the invention, the developmental effort/expense for the control system is kept on a low level and its practicability is improved, since commercially available measuring devices can be employed. This also holds true for a preferred embodiment of the invention in which an electronic controller uses a microprocessor.

BRIEF DESCRIPTION OF THE DRAWING

Further features of the invention can be found in the following description and the drawing, in which exemplary embodiments of the invention are illustrated schematically.

The FIGURE shows
 a schematic diagram of a gas motor or engine with its control system.

DETAILED DESCRIPTION OF THE DRAWING

The gas motor 1 receives its fuel-gas/air mixture from the fuel-gas/air mixer 7, which is supplied with combustion air from the combustion-air line 11 and with fuel gas from the fuel-gas line 12.

The fuel-gas/air mixture passes via the mixture line 10 to the throttle valve 3, on which there is a measuring device for the measurement of the throttle-valve setting.

The throttle valve 3 is adjusted by a speed controller 2. Its setting, which is a measure of the motor or engine load, is supplied to a microprocessor-controlled controller 5.

Said device can also additionally receive measured values from the speed transmitter 13, which is driven by the toothed rim of the flywheel. In addition, measured values are fed to the controller 5 from the oxygen measuring probe 4, which is located in the exhaust-gas line 9 from the ignition system 8, which supplies the actual value of the ignition point, and from the gas-quality measuring device 6, which is located in the region of the fuel-gas line 12. As illustrated in the drawing, the measuring device 6 is connected to the fuel-gas line 12 and it delivers a measurement signal to the electronic controller indicative of the calorific or heating value of the fuel-gas being delivered by said line 12.

By means of appropriate processing of the input data in the microprocessor, the electronic controller 5 generates the required signals for final control elements of the ignition system 8 or of the fuel-gas/air mixer 7. Thus, the ignition point and/or the oxygen content in the exhaust gas is controlled in such a fashion that the required exhaust-gas quality is achieved at the lowest possible fuel-gas consumption.

The embodiments of the invention in which an exclusive property or privilege is claimed are defined as follows:

1. A method of operating a fuel gas burning motor having spark ignition or pilot injection ignition and which runs with an oxygen excess, comprising the steps of providing a controller, an oxygen measuring probe measuring the oxygen in the exhaust gas of said motor and delivering to said controller a signal indicative of the oxygen content of said exhaust gas, a gas quality measuring device measuring the calorific value of fuel gas supplied to said motor and delivering a signal to said controller indicative of the calorific value of fuel gas supplied to said motor and delivering a signal to said controller indicative of the calorific value of said fuel gas, a fuel gas/air mixer delivering a fuel gas/air mixture to said motor and a throttle value for the fuel gas-/air mixture operable to deliver a signal to said controller indicative of the speed setting of said motor, said fuel gas/air mixer being connected in controlled relation to said controller, generating an output signal by said controller in response to said signals delivered to said controller, and regulating the composition of said fuel gas/air mixture by said fuel gas/air mixer responding to said output signal.

2. The method of claim 1 wherein said output signal also adjusts the timing of said spark ignition.

3. The method of claim 1 wherein said output signal also adjusts the timing of said pilot injection ignition.

4. The method of claim 1 wherein said output signal is generated by an electronic controller.

5. An apparatus for controlling the operation of a gas motor equipped with a combustion ignition unit, a mixture throttle valve (3), a fuel-gas/air mixer (7) connected in delivery relation to said throttle valve (3), a final control element for said fuel-gas/air mixer (7) and an exhaust gas line (9), said apparatus including:

a fuel gas supply line (12) connected to said fuel-gas-/air mixer (7), an electronic controller (5) having an output connected controlling relation to said final control element of said fuel-gas/air mixer (7), an oxygen measuring device (4) in said exhaust gas line (9) connected to said electronic controller (5) and operable to deliver a measurement signal to said electronic controller (5) indicative of the level of oxygen content in the exhaust gas in said exhaust gas line (9), a mechanism measuring the setting of said mixture throttle valve (3) and connected to said electronic controller (5) to deliver a measurement signal thereto indicative of said setting, a device (6) connected to said fuel-gas line (12) operative to measure the calorific value of fuel-gas being delivered by said fuel-gas line (12), said device (6) being connected to said electronic controller (5) to deliver a measurement signal to the latter indicative of the measured calorific value of the fuel-gas in said fuel-gas line, said electronic controller (5) in response to said measurement signals producing a final output signal which is delivered by its output to said final control element of said fuel-gas/air mixer (7).

6. The apparatus of claim 5 wherein said output of said electronic controller (5) is also connected in controlling relation to said combustion ignition unit.

7. The apparatus of claim 5 wherein said controller is a microprocessor-controlled controller.

* * * * *

UNITED STATES PATENT AND TRADEMARK OFFICE
CERTIFICATE OF CORRECTION

PATENT NO. : 5,341,299
DATED : August 23, 1994
INVENTOR(S) : Stellwagen et al.

It is certified that error appears in the above-indentified patent and that said Letters Patent is hereby corrected as shown below:

Col. 3, line 6 delete "of fuel gas supplied to said motor and delivering a signal to said controller indicative of the calorific value";

Col. 4, line 4 after "nected" insert --in--.

Signed and Sealed this

Twentieth Day of December, 1994

Attest:

BRUCE LEHMAN

Attesting Officer        Commissioner of Patents and Trademarks